(12) United States Patent
Komatsubara

(10) Patent No.: US 10,744,875 B2
(45) Date of Patent: Aug. 18, 2020

(54) CONTROL DEVICE FOR TORQUE DISTRIBUTOR

(71) Applicant: HONDA MOTOR CO., LTD., Tokyo (JP)

(72) Inventor: Masaru Komatsubara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/466,707

(22) PCT Filed: Dec. 4, 2017

(86) PCT No.: PCT/JP2017/043483
§ 371 (c)(1),
(2) Date: Jun. 5, 2019

(87) PCT Pub. No.: WO2018/110346
PCT Pub. Date: Jun. 21, 2018

(65) Prior Publication Data
US 2019/0299777 A1    Oct. 3, 2019

(30) Foreign Application Priority Data
Dec. 13, 2016    (JP) ................................ 2016-241699

(51) Int. Cl.
*B60K 23/04*    (2006.01)
*B60K 17/344*    (2006.01)
*B60K 23/08*    (2006.01)

(52) U.S. Cl.
CPC ............ *B60K 17/344* (2013.01); *B60K 23/04* (2013.01); *B60K 23/0808* (2013.01); *B60L 2240/423* (2013.01)

(58) Field of Classification Search
CPC .. B60K 23/04; B60K 23/0808; B60W 10/119; B60W 10/14; B60W 30/02; B60W 30/18145; B60W 2520/14
See application file for complete search history.

(56) References Cited

U.S. PATENT DOCUMENTS

| 2004/0064239 A1* | 4/2004 | Nagura | B60K 23/0808 701/89 |
| 2007/0184929 A1* | 8/2007 | Piyabongkarn | B60K 17/34 475/84 |

(Continued)

FOREIGN PATENT DOCUMENTS

| JP | 10-35313 A | 2/1998 |
| JP | 2004-17721 A | 1/2004 |

(Continued)

OTHER PUBLICATIONS

International Search Report dated Feb. 20, 2018, issued in counterpart application No. PCT/JP2017/043483 (2 pages).

(Continued)

*Primary Examiner* — Edwin A Young
(74) *Attorney, Agent, or Firm* — Westerman, Hattori, Daniels & Adrian, LLP

(57) ABSTRACT

A control device is disclosed for a torque distributor arranged between front and rear wheels that can achieve both reduction of vibrations and noises caused by torque transmitted to rear wheels by the torque distributor and securing of turning performance and driving performance. The control device is provided with a normative yaw rate calculation section for calculating a normative yaw rate that is a target value of a yaw rate when the vehicle turns and a yaw rate deviation calculation section for calculating a yaw rate deviation that is a difference between the normative yaw rate and the actual yaw rate. When the yaw rate deviation falls below a threshold Th1, a value of a command torque is (Continued)

limited to a predetermined limit torque value, and when the yaw rate deviation exceeds a threshold Th2, the limit of the command torque by a limit torque value is released.

12 Claims, 8 Drawing Sheets

(56) References Cited

U.S. PATENT DOCUMENTS

| | | | |
|---|---|---|---|
| 2007/0192011 A1* | 8/2007 | Piyabongkarn | B60W 30/045 701/70 |
| 2009/0043469 A1 | 2/2009 | Fukuda et al. | |
| 2010/0252348 A1 | 10/2010 | Ueda et al. | |
| 2013/0073160 A1 | 3/2013 | Tsushima | |
| 2016/0355177 A1* | 12/2016 | Varisco | B60K 23/04 |

FOREIGN PATENT DOCUMENTS

| | | |
|---|---|---|
| JP | 2007-125998 A | 5/2007 |
| JP | 2009-40151 A | 2/2009 |
| JP | 2009-107382 A | 5/2009 |
| JP | 2010-241210 A | 10/2010 |
| JP | 2012-17053 A | 1/2012 |
| JP | 2013-35516 A | 2/2013 |
| JP | 2013-233018 A | 11/2013 |
| WO | 2016/121546 A1 | 8/2016 |

OTHER PUBLICATIONS

Office Action dated Apr. 28, 2020, issued in counterpart JP Application No. 2018-556587, with English Translation. (8 pages).

\* cited by examiner

CONTROL DEVICE FOR TORQUE DISTRIBUTOR

TECHNICAL FIELD

The present invention relates to a control device for a torque distributor including a control means for controlling a torque of power from a power source that is distributed by the torque distributor to first driving wheels (namely, main driving wheels) and second driving wheels (namely, auxiliary driving wheels).

BACKGROUND ART

Conventionally, a vehicle (namely, four-wheel-drive vehicle) includes a torque distributor for distributing a torque of power generated in a power source such as an engine to main driving wheels and auxiliary driving wheels. In this kind of vehicle, for example, with the main driving wheels and the auxiliary driving wheels being respectively front wheels and rear wheels, the torque of power generated in the power source is transmitted to the front wheels via a front drive shaft and a front differential and also to the torque distributor provided with a hydraulic multidisc-type clutch via a propeller shaft. And, by supplying hydraulic fluid at a predetermined pressure to the torque distributor from a hydraulic control device, an engagement pressure of the torque distributor is controlled. Thus, the torque of power from the power source is transmitted to the rear wheels at a predetermined distribution ratio. For example, refer to Patent Document 1.

In the calculation of a torque distribution (namely, command torque) distributed to the rear wheels with respect to the front wheels in the control device for the torque distributor, a rear wheel basic distribution torque serving as a base torque of the command torque is calculated from data such as a load ratio of the rear wheels with respect to the front wheels and an estimated driving force. And, the torque distribution (command torque) to the rear wheels with respect to the front wheels is determined on the basis of this rear wheel basic distribution torque.

RELATED ART DOCUMENTS

Patent Documents

[Patent Document 1] Japanese Unexamined Patent Application Publication No. 2013-035516

DISCLOSURE OF THE INVENTION

Problems to be Solved by the Invention

In the meantime, operation noises and vibrations of a rear differential device, etc. occur when a torque is transmitted to the rear wheels by the torque distributor in the vehicle provided with the above-described torque distributor. Therefore, for the purpose of reduction of noises and vibrations due to transmission of the torque to the rear wheels using such torque distributor, control may be performed to limit a value of the command torque to a limit value when the value of the command torque exceeds the predetermined limit value.

However, because of the execution of the control to limit the value of the command torque to the limit value, an appropriate driving force might not be transmitted to the rear wheels under a road surface condition that the driving performance of the vehicle needs to be secured. That is to say, for example, if the control of limiting the value of the command torque to the limit value is performed when the vehicle falls into an unstable running condition such as a side slip while turning and accelerating on a low friction road surface such as on snow, a torque for restoring the stable running condition of the vehicle might not be distributed to the rear wheels. In other words, in the above-described control device for the torque distributor, as the value of the command torque is limited to a low value, it may be difficult to secure the turning performance and running stability (namely, running performance) of the vehicle according to conditions of a road surface on which the vehicle is running.

The present invention was made in view of above-mentioned point, and the purpose is to provide the control device for the torque distributor that can achieve both the reduction of vibrations and noises and the securing of the driving performance of the vehicle by enabling transmission of the necessary torque to the rear wheels, etc. using the torque distributor under a road surface condition that the driving performance of the vehicle is required, while achieving reduction of noises and vibrations due to the torque transmitted to the rear wheels (second driving wheels), etc. by the torque distributor.

Means of Solving the Problems

In order to achieve the above objects, the present invention is a control device for a torque distributor including a torque transmission path (20) for transmitting a torque of power from a power source (3) of a vehicle (1) to first driving wheels (W1, W2) and second driving wheels (W3, W4), the torque distributor (10) arranged between the power source (3) and the second driving wheels (W3, W4) in the torque transmission path (20), and a control means (50) for acquiring a demand value of the torque distributed to the second driving wheels (W3, W4) using the torque distributor (10) and then outputs a command torque (TRCMD) that is a command value of a torque corresponding to a demand value of the torque. The control device includes a yaw rate detection section (S6) for detecting an actual yaw rate of the vehicle. The control means (50) has a normative yaw rate calculation section (521B) for calculating a normative yaw rate (Y0) that is a target value of a yaw rate of the vehicle (1) and a yaw rate deviation calculation section (521C) for calculating a yaw rate deviation ($\Delta Y$) that is a difference between the normative yaw rate (Y0) and the actual yaw rate (Y1). The control means (50) performs control to limit the command torque (TRCMD) to the limit value when the command torque (TRCMD) exceeds a predetermined limit value (TRLIM), and releases the limit of the command torque (TRCMD) by the limit value (TRLIM) when the yaw rate deviation ($\Delta Y$) calculated in the yaw rate deviation calculation section (521C) exceeds a predetermined threshold (Th) while performing the control of limiting the command torque (TRCMD) to the limit value.

The control device for the torque distributor in accordance with the present invention is configured to release the limit of the command torque by the limit value when the yaw rate deviation exceeds the predetermined threshold during the execution of the control, while performing the control to limit the command torque to the limit value when the command torque for the torque distributor exceeds the predetermined limit value. In other words, the control device judges that the vehicle is turning running relatively stably without greatly deviating from the normative yaw rate when the yaw rate deviation does not exceed the threshold, thereby executing the command torque limit. This can achieve suppression of noises and vibrations due to the torque transmitted to the second driving wheels using the torque distributor. On the other hand, when the yaw rate deviation exceeds the threshold, the control device judges that the vehicle is turning running in an unstable state, greatly deviating from the normative yaw rate, thereby releasing the command torque limit. Thus, when the vehicle is judged to be turning running unstably in the state in which the command torque is limited in an attempt to reduce vibrations and noises, the torque necessary for the vehicle to stably turn running can be distributed to the second driving wheels. This can achieve both the reduction of vibrations and noises and the securing of the driving performance of the vehicle by enabling transmission of the necessary torque to the rear wheels, etc. using the torque distributor under a road surface condition that the driving performance of the vehicle is required, while achieving reduction of noises and vibrations due to the torque transmitted to the second driving wheels etc. by the torque distributor.

Furthermore, in the present invention of the above-described configuration, the control means (50) may again limit the command torque (TRCMD) by the limit value (TRLIM) when the yaw rate deviation ($\Delta Y$) becomes smaller than or equivalent to the predetermined threshold (Th) after exceeding the predetermined threshold (Th). Alternatively, the control device (50) includes a lateral acceleration detection section (S7) for detecting a lateral acceleration (YG) of the vehicle (1). And, the control means (50) may again execute the limitation of the command torque (TRCMD) by the limit value (TRLIM) when the lateral acceleration (YG) detected by the lateral acceleration detection section (S7) becomes smaller than or equivalent to the predetermined value after the yaw rate deviation ($\Delta Y$) exceeds the predetermined threshold (Th).

According to this configuration, the vehicle can be judged to have returned to the state in which the vehicle is again turning running relatively stably when the yaw rate deviation becomes smaller than or equivalent to the predetermined threshold after exceeding the predetermined threshold. Accordingly, the second performance of limiting the command torque can suppress noises and vibrations due to the torque transmitted to the second driving wheels using the torque distributor. Alternatively, the vehicle can be judged to have finished turning and returned to straight running when the lateral acceleration becomes smaller than or equivalent to the predetermined value. Accordingly, in this case also, the second performance of limiting the command torque can suppress noises and vibrations due to the torque transmitted to the second driving wheels using the torque distributor.

Moreover, the present invention is the control device for the torque distributor including the torque transmission path (20) for transmitting a torque of power from the power source (3) of the vehicle (1) to the first driving wheels (W1, W2) and the second driving wheels (W3, W4), the torque distributor (10) disposed between the power source (3) and the second driving wheels (W3, W4) in the torque transmission path (20), and the control means (50) for acquiring a demand value of a torque distributed to the second driving wheels (W3, W4) using the torque distributor (10) so as to output a command torque (TRCMD) that is a command value of a toque corresponding to the demand value of the torque. The control device includes a yaw rate sensor (S6) for detecting an actual yaw rate (Y1) of the vehicle. The control means (50) has the yaw rate calculation section (521B) for calculating a normative yaw rate (Y0) that is a target value of the yaw rate of the vehicle (1), and the yaw rate deviation calculation section (521C) for calculating a yaw rate deviation ($\Delta Y$) that is a difference between the normative yaw rate (Y0) and the actual yaw rate (Y1). The control means (50) characteristically performs control of limiting the value of the command torque (TRCMD) to the predetermined limit value (TRLIM) when the yaw rate deviation ($\Delta Y$) is smaller than or equivalent to a predetermined threshold (Th).

According to the above-described present invention, the vehicle is judged to be turning running relatively stably without greatly deviating from the normative yaw rate when the yaw rate deviation is smaller than or equivalent to the threshold, whereby the control means (50) limits the command torque. This can achieve suppression of noises and vibrations due to the torque transmitted to the second driving wheels using the torque distributor.

In addition, in either of the above-described present inventions, the control means (50) should better calculate a corrected yaw rate deviation ($\Delta Y'$), which is a more moderate change in the yaw rate ($\Delta Y$) corrected from an actual change, when the yaw rate deviation ($\Delta Y$) decreases, and accordingly apply the threshold (Th) to this corrected yaw rate deviation ($\Delta Y'$).

According to this configuration, the correction of the decreasing yaw rate deviation to the corrected yaw rate deviation that is a more moderate change corrected from the actual change enables lengthening of the time needed for the judgment that the yaw rate deviation again has fallen below the threshold after exceeding the threshold. This can secure a judgment time enough to judge that the turning state of the vehicle has shifted from an unstable state to a stable state. Therefore, after having fully judged that the turning state of the vehicle has shifted to the stable state, the command torque can be again limited to the limit value.

Moreover, in either of the above-described present inventions, the threshold (Th) has a first threshold (Th1) at the time of increase in the yaw rate deviation ($\Delta Y$) and a second threshold (Th2) at the time of decrease in the yaw rate deviation ($\Delta Y$). The first threshold (Th1) should better be set to a value higher than the second threshold (Th2).

According to this configuration, the yaw rate deviation steps over the thresholds (namely, the first threshold and the second threshold) repeatedly in a short time, which can prevent a hunting phenomenon that is a frequent repetition of the limit by the limit value of the command torque and the release thereof.

Effects of the Invention

The control device for the torque distributor can achieve both the reduction of vibrations and noises and the securing of the driving performance of the vehicle by enabling transmission of the necessary torque to the second driving wheels using the torque distributor under a road surface condition that the driving performance of the vehicle is required, while achieving reduction of noises and vibrations due to the torque transmitted to the second driving wheels by the torque distributor.

MODE FOR CARRYING OUT THE INVENTION

Figure 1:
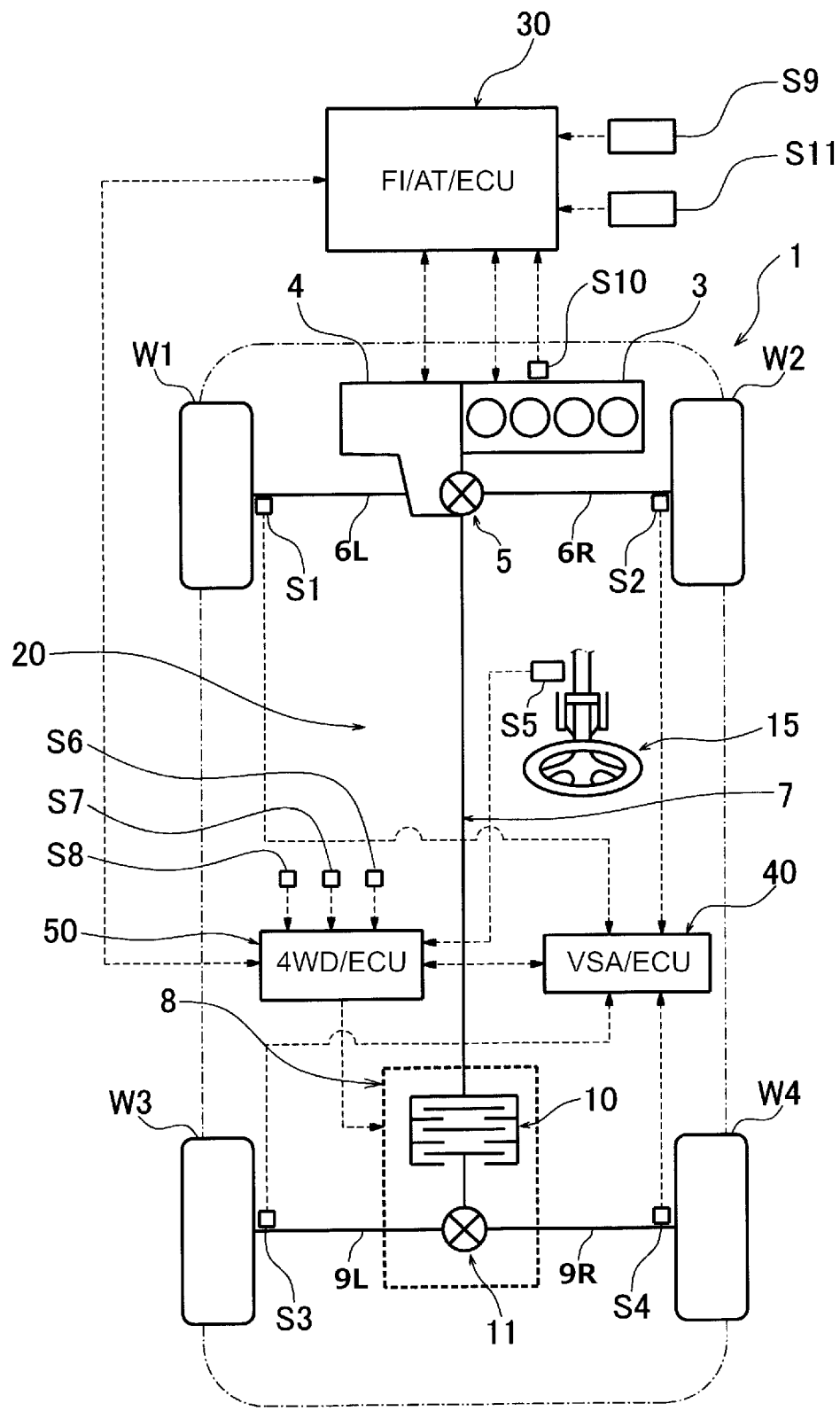
FIG. 1 is a schematic view illustrating a configuration of a four-wheel-drive vehicle including a control device for a torque distributor in accordance with one embodiment of the present invention.

Hereinafter, an embodiment of the present invention will be described in detail with reference to the accompanying drawings. FIG. 1 is a schematic view illustrating a configuration of a four-wheel-drive vehicle including a control device for a torque distributor in accordance with an embodiment of the present invention. The four-wheel-drive vehicle 1 shown in the same figure includes an engine (namely, power source) 3 installed laterally on the front part of the vehicle, an automatic transmission 4 installed integrally with the engine 3, and a torque transmission path 20 for transmitting a torque of power from the engine (power source) 3 to front wheels W1, W2 and rear wheels W3, W4.

An output shaft (not shown in the figure) of the engine 3 is connected to the left and right front wheels W1, W2, which are main driving wheels (namely, first driving wheels), via the automatic transmission 4, a front differential (hereinafter referred to as "front diff") 5, and left and right front drive shafts 6L, 6R. In addition, the output shaft of the engine 3 is connected to the left and right rear wheels W3, W4, which are auxiliary driving wheels (namely, second driving wheels), via the automatic transmission 4, the front diff 5, a propeller shaft 7, a rear differential unit (hereinafter referred to as "rear diff unit") 8, and left and right rear drive shafts 9L, 9R.

The rear diff unit 8 is equipped with a rear differential (hereinafter referred to as "rear diff") 19 and a front and rear torque distribution clutch (namely, torque distributor) 10. The rear diff 19 distributes a driving force to the left and right rear drive shafts 9L, 9R. The front and rear torque distribution clutch 10 connects and disconnects the torque transmission path from the propeller shaft 7 to the rear diff 19. The front and rear torque distribution clutch 10 (hereinafter referred to also as "clutch 10") is a hydraulic clutch and is a driving force distribution device for controlling distribution of a driving force to the rear wheels W3, W4 in the torque transmission path 20. A 4WD/ECU 50, which will be described later, performs drive control with the front wheels W1, W2 and the rear wheels W3, W4 serving respectively as the main driving wheels and the auxiliary driving wheels by controlling a driving force distributed to the rear wheels W3, W4 using the front and rear torque distribution clutch 10.

In other words, when the front and rear torque distribution clutch 10 is released (or disengaged), no rotation of the propeller shaft 7 is transmitted to the rear diff 11 side and the whole torque of the engine 3 is transmitted to the front wheels W1, W2, resulting in the front-wheel drive (2WD) state. On the other hand, when the front and rear torque distribution clutch 10 is engaged, the rotation of the propeller shaft 7 is transmitted to the rear diff 11 side, thereby distributing the torque of the engine 3 to both the front wheels W1, W2 and the rear wheels W3, W4, resulting in the four-wheel-drive (4WD) state.

The four-wheel-drive vehicle 1 is equipped with an FI/AT/ECU 30, a VSA/ECU 40, and the 4WD/ECU 50 that are control means for controlling driving of the vehicle. The four-wheel-drive vehicle 1 is also provided with a left front wheel speed sensor S1 for detecting a wheel speed of the left front wheel W1 on the basis of a rotation speed of the left front drive shaft 6L, a right front wheel speed sensor S2 for detecting a wheel speed of the right front wheel W2 on the basis of a rotation speed of the right front drive shaft 6R, a left rear wheel speed sensor S3 for detecting a wheel speed of the left rear wheel W3 on the basis of a rotation speed of the left rear drive shaft 9L, and a right rear wheel speed sensor S4 for detecting a wheel speed of the right rear wheel W4 on the basis of a rotation speed of the right rear drive shaft 9R. Thus, these four wheel-speed sensors S1-S4 detect wheel speeds VW1-VW4 of the four wheels respectively. Detected signals of the wheel speeds VW1-VW4 are sent to the VSA/ECU 40.

In addition, the four-wheel-drive vehicle 1 is equipped with a steering angle sensor S5 for detecting a steering angle δ of a steering wheel 15, a yaw rate sensor S6 for detecting a yaw rate of a vehicle body, a lateral acceleration sensor S7 for detecting a lateral acceleration YG of the vehicle body, a vehicle speed sensor S8 for detecting a vehicle body speed of the vehicle (namely, vehicle speed), etc. Detected signals from the steering angle sensor S5, the yaw rate sensor S6, the lateral acceleration sensor S7, and the vehicle speed sensor S8 are sent to 4WD/ECU 50.

The FI/AT/ECU 30 is a control means for controlling the engine 3 and the automatic transmission 4, and is configured to include a microcomputer composed of a RAM, a ROM, a CPU and an I/O interface (none of which is shown in the figure). A signal of an accelerator opening (or, throttle opening) AP detected by an accelerator opening sensor (or, throttle opening sensor) S9, a signal of an engine rotational speed Ne detected by an engine rotational speed sensor S10, a signal of a shift position detected by a shift position sensor S11, etc. are sent to the FI/AT/ECU 30. In addition, an engine torque map describing a relationship between the engine rotational speed Ne, the throttle opening AP and an engine torque estimation value Te is stored in the FI/AT/ECU 30, which is configured to calculate the engine torque estimation value Te based on the throttle opening Th detected by the accelerator pedal opening sensor S9 and the engine rotational speed Ne detected by the engine rotational speed sensor S10.

The VSA/ECU 40 is a control means including a function of an ABS (Antilock Braking System) for preventing a wheel lock at the time of braking by performing an anti-lock control of the left and right front wheels W1, W2 and the left and right rear wheels W1, W4, a function of a TCS (Traction Control System) for preventing idle running of wheels at the time of acceleration of the vehicle, and a function of a side slip suppression system at the time of turning, and performs a vehicle behavior stability control by controlling these three functions. Similar to the above-described FI/AT/ECU 30, the VSA/ECU 40 is composed of a microcomputer.

The 4WD/ECU 50 is composed of a microcomputer, similar to the FI/AT/ECU 30 and the VSA/ECU 40. The 4WD/ECU 50, the FI/AT/ECU 30 and the VSA/ECU 40 are connected to each other. Therefore, signals detected from the above-described wheel-speed sensors S1-S4 and the shift position sensor S10, and information of the engine torque estimation value Te are input to the 4WD/ECU 50 via serial communication with the FI/AT/ECU 30 and the VSA/ECU 40. Depending on such input information, as well as on the basis of a control program stored in the ROM and each of flag values and calculated values stored in the RAM, the 4WD/ECU 50 calculates a driving force distributed to the rear wheels W3, W4 (hereinafter referred to as "command torque RCMD") and a corresponding hydraulic pressure supply to the front and rear torque distribution clutch 10, as will be described later, and outputs a driving signal based on results of this calculation to the front and rear torque distribution clutch 10.

Figure 2:
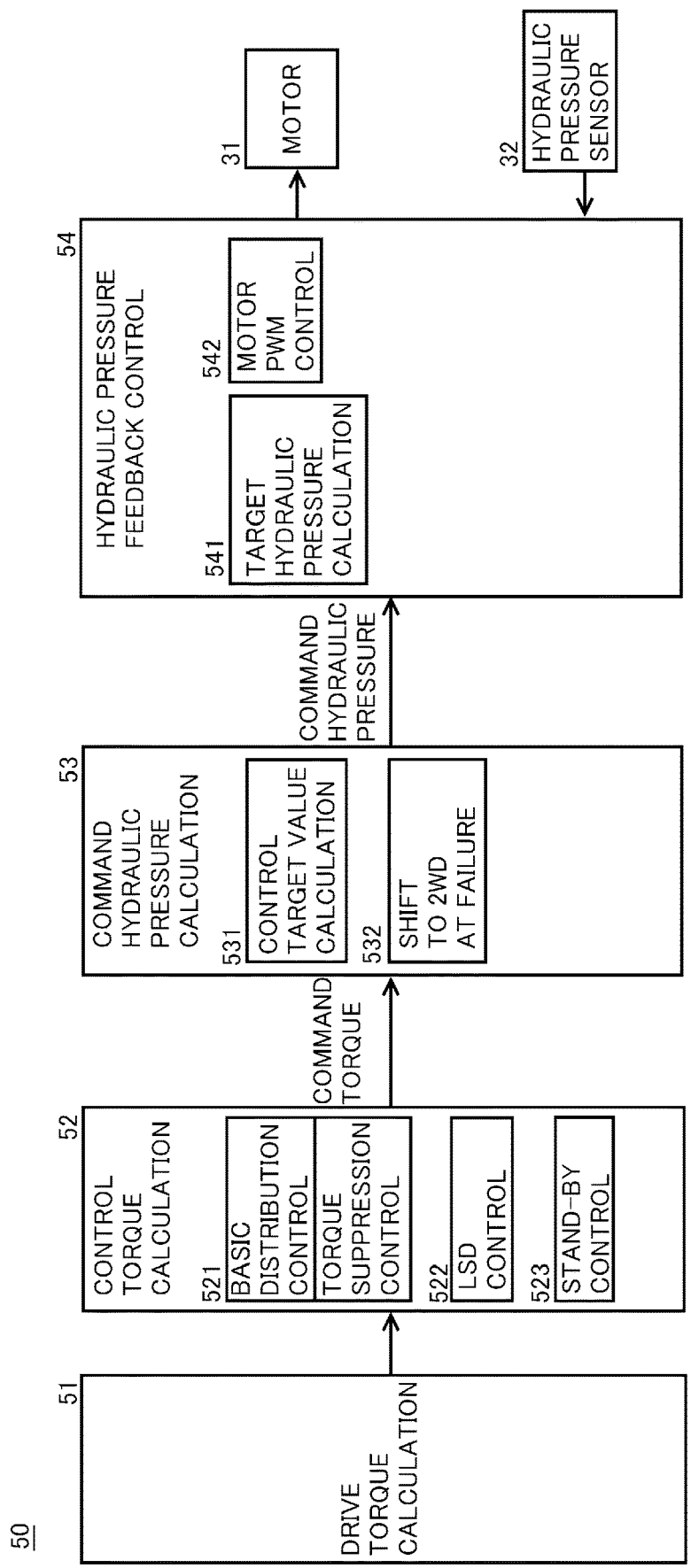
FIG. 2 is a view of a main functional block of the 4WD/ECU.

FIG. 2 is a view of a main functional block of the 4WD/ECU (namely, control means). A drive torque calculation block 51 calculates a total drive torque (namely, estimated total driving force) required for the front and rear wheels W1-W4 depending on a running condition of the vehicle 1 (such as a torque of the engine 3, a selected gear step and a shift position).

In a control torque calculation block 52, a basic distribution control (namely, basic distribution control of a driving force distributed to the front and rear wheels W1-W4) block 521, an LSD control block 522, a stand-by control block 523, etc. determine a torque distribution (rear wheel basic distribution torque TR) of the estimated total drive torque to the rear wheels W3, W4 with respect to the front wheels W1, W2 depending on various kinds of control factors. In addition, a torque suppression control is performed for a rear wheel basic distribution torque TR, as will be described below.

A command hydraulic pressure calculation block 53 calculates a command hydraulic pressure for the clutch 10 according to the command torque TRCMD. That is to say, a control target value calculation block 531 calculates a control target value (namely, the command hydraulic pressure) for the clutch 10 according to the command torque TRCMD. And, a block for shifting to 2WD at failure 532 calculates the control target value (namely, the command hydraulic pressure) for shifting to 2WD at failure. At a normal time, on one hand, the control target value calculated by the control target value calculation block 531 is output as the command hydraulic pressure. At failure, on the other hand, the control target value calculated by the block for shifting to 2WD at failure 532 is output as the command hydraulic pressure.

In a hydraulic pressure feedback control block 54, a target hydraulic pressure calculation block 541 calculates a target hydraulic pressure (namely, a hydraulic pressure deviation) of the clutch 10 according to a deviation between the above-mentioned command hydraulic pressure given from the command hydraulic pressure calculation block 53 and an actual hydraulic pressure (namely, a feedback signal from the hydraulic pressure sensor 32), so as to control the motor 31 according to this calculated target hydraulic pressure (namely, a hydraulic pressure deviation) using a motor PWM control block 542. The motor 31 is an electric motor for driving a hydraulic pump (not shown in the figure) to supply an operating hydraulic pressure to the clutch 10. The hydraulic pressure sensor 32 measures a hydraulic pressure supplied to the clutch 10. The motor PWM control block 542 generates a PWM driving command signal for the motor 31 depending on the target hydraulic pressure (namely, hydraulic pressure deviation).

Thus, the hydraulic pressure feedback control is carried out in this way so that the actual hydraulic pressure follows the command hydraulic pressure. It should be noted that a solenoid valve (namely, opening and closing valve) for supplying a hydraulic pressure to the clutch 10 may be provided so that the motor is configured to perform a hydraulic pressure sealing control (namely, pressurization by intermittently driving the motor 31 in the solenoid valve closed state and depressurization by intermittently opening the solenoid valve in the motor 31 state) by opening or closing the solenoid valve (opening and closing valve) as needed, thereby reducing frequency in use of the motor 31.

Figure 3:
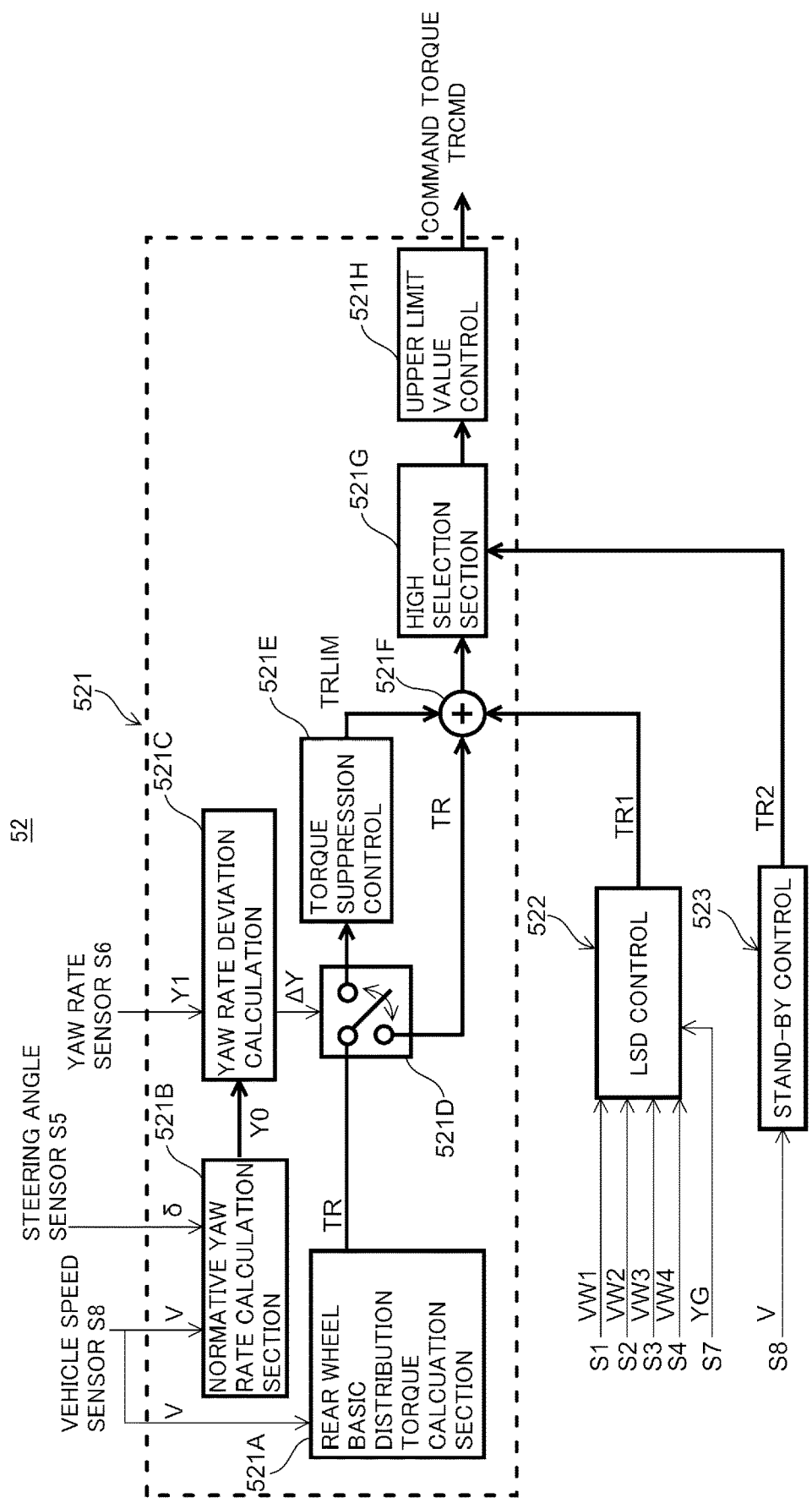
FIG. 3 is an explanatory view indicating details of a configuration of a control torque calculation block shown in FIG. 2.

FIG. 3 is a view showing the details of the configuration of the control torque calculation block 52 shown in FIG. 2. The basic distribution control block 521 is configured to include a rear wheel basic distribution torque calculation section 521A, a yaw rate deviation calculation section 521C, a yaw rate deviation switch section 521D, a torque suppression control section 521E, an adder 521F, a high selection section 521G, and an upper limit value limiting section 521H. The rear wheel basic distribution torque calculation section 521A calculates a rear wheel basic distribution torque TR (FIG. 4) that is a base torque of the torque (command torque TRCMD) distributed to the rear wheels W3, W4 by the clutch 10. The yaw rate deviation calculation section 521C calculates a yaw rate deviation ΔY that is a difference between a normative yaw rate Y0 and an actual yaw rate Y1 of the vehicle 1. The yaw rate deviation switch section 521D outputs a rear wheel basic distribution torque TR to the adder 521F when a yaw rate deviation ΔY exceeds a threshold Th, while outputting a rear wheel basic distribution torque TR to the torque suppression control section 521E when a yaw rate deviation ΔY is smaller or equivalent to a threshold Th (Th1, Th2). The torque suppression control section 521E limits a rear wheel basic distribution torque TR to a limit torque value (namely, limit value) TRLIM.

The adder 521F adds an LSD torque TR1 to one of the rear wheel basic distribution torque TR and the limit torque level TRLIM. The high selection section 521G selects and outputs a higher one of a torque value output from the adder 521F and a torque value output from the stand-by control section unit 523 to the upper value limit section 521H. The upper limit value limit section 521H limits the torque value input from the high selection section 521G by a predetermined upper limit value. Each of the above configurations will be further described below.

Figure 4:
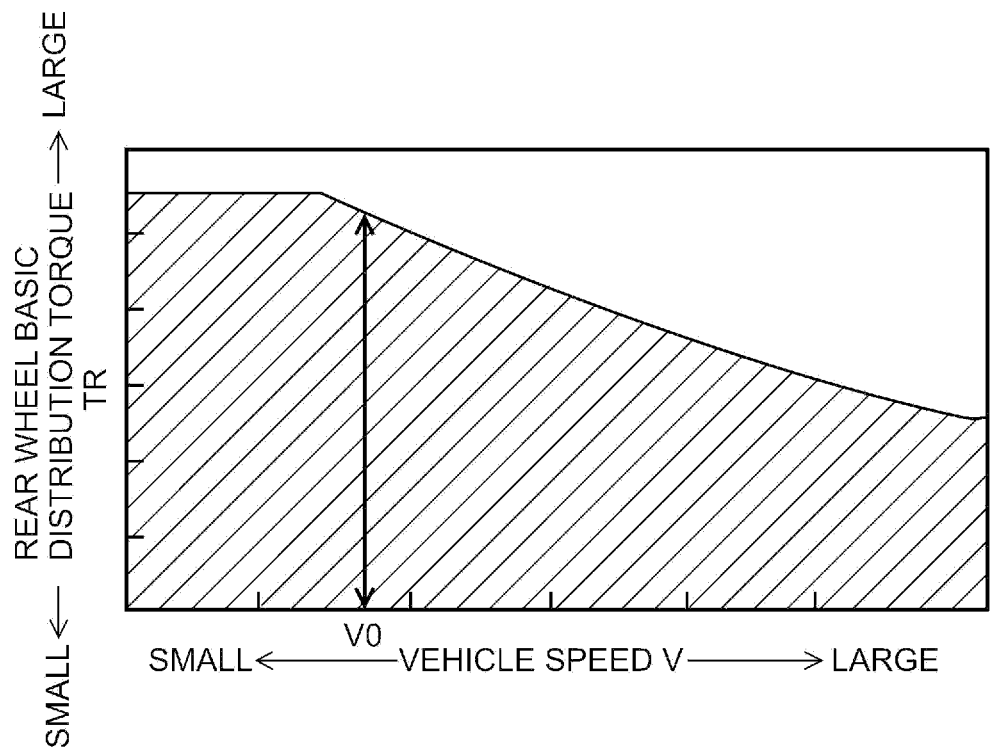
FIG. 4 is an explanatory view indicating a rear wheel basic distribution torque that serves as a base torque of a command torque calculated by a rear wheel basic distribution torque calculation section.

FIG. 4 is an explanatory view showing the rear wheel basic distribution torque TR that is a base torque of the command torque TRCMD calculated by the rear wheel basic distribution torque calculation section 521A. The rear wheel basic distribution torque TR is calculated on the basis of the estimated total drive torque calculated in the drive torque calculation section 51 and a ground load ratio (namely, a value that is a static load ratio corrected with a front-rear direction acceleration of the vehicle 1) of the rear wheels (auxiliary driving wheels) W3, W4 with respect to the front wheels (main driving wheels) W1, W2 when the vehicle 1 is running at a vehicle speed V. It should be noted that the rear wheel basic distribution torque TR is determined uniquely depending on the vehicle speed V and appropriately increased and decreased depending on a running condition of the vehicle 1. Therefore, the scope that can be covered by the rear wheel basic distribution torque TR is indicated by the shaded area in the figure. For example, the scope that can be covered by the rear wheel basic distribution torque TR at a vehicle speed V0 is indicated by the arrow in the figure.

Back to FIG. 3, a normative yaw rate calculation section 521B calculates a normative yaw rate Y0 from a vehicle speed V and a steering angle δ of the vehicle 1 on the basis of a well-known ideal two-wheel vehicle model. The vehicle speed V can be obtained as a measured value of the vehicle speed sensor S8. The steering angle δ can be obtained as a measured value of the steering angle sensor S5.

The yaw rate deviation calculation section 521C inputs an actual yaw rate Y1 of the vehicle 1 that can be obtained as a measured value of the yaw rate sensor S6 and a normative yaw rate Y0 output from the normative yaw rate calculation section 521B and then calculates a yaw rate deviation ΔY that is a difference between the actual yaw rate Y1 and the normative yaw rate Y0.

The torque suppression control section 521E performs a torque suppression control so as to limit the rear wheel basic distribution torque TR to the limit torque value TRLIM when the yaw rate deviation ΔY falls below the threshold Th, and release the torque limit for the rear wheel basic distribution torque TR by the limit torque value TRLIM when the yaw rate deviation ΔY exceeds the threshold Th. This torque suppression control will be described later with reference to FIGS. 6 and 7.

The adder 521F adds a LSD torque TR1 output from the LSD control section 522 to the rear wheel basic distribution torque TR or the limit torque value TRLIM. It should be noted that this LSD torque TR1 is an added torque for assisting the rear wheel basic distribution torque TR that is a base torque of the command torque TRCMD calculated according to an actual clutch differential rotation ΔN in a feedback control (hereinafter referred to as "LSD control") for converging a differential rotation (hereinafter referred to as "actual clutch differential rotation") ΔN that is a difference between an input shaft rotation speed of the clutch 10 on the front wheel (main driving wheel) W1, W2 side and an output shaft rotation speed of the clutch 10 on the rear wheel (auxiliary driving wheel) W3, W4 side to a predetermined target value (hereinafter referred to as "target clutch differential rotation") ΔN0 or less.

The high selection section 521G selects a maximum value of a torque value output from the adder 521F (namely, a rear wheel basic distribution torque TR+an LSD torque TR1, a limit torque value TRLIM+an LSD torque TR1) and a torque value output from the standby control unit 523 (namely, a stand-by torque TR2) and outputs the selected maximum value to the upper limit value limit section 521H.

The upper limit value limit section 521H sets a predetermined upper limit value for a torque value output from the high selection section 521G for the purpose of protecting the rear diff unit 8. Then, on one hand, when the torque value exceeds the upper limit value, the upper limit value limit section 521H outputs the said upper limit value as the command torque TRCMD, and on the other hand, when the torque value does not exceed such upper limit value, outputs the said torque value as the command torque TRCMD.

The LSD control section 522 inputs detected signals from the four wheel speed sensors S1-S4 and then measures corresponding wheel speeds VW1-VW4 so as to calculate an actual clutch differential rotation ΔN. Then, when the actual clutch differential rotation ΔN exceeds a predetermined threshold ΔNth, the LSD control section 522 performs an LSD control. Therefore, when the actual clutch differential rotation ΔN is smaller than or equivalent to the threshold ΔNth, the LSD control section 522 performs no LSD control. In the following, "LSD control dead zone area" that is a scope of the actual clutch differential rotation ΔN at which no LSD control is performed will be described.

Figure 5:
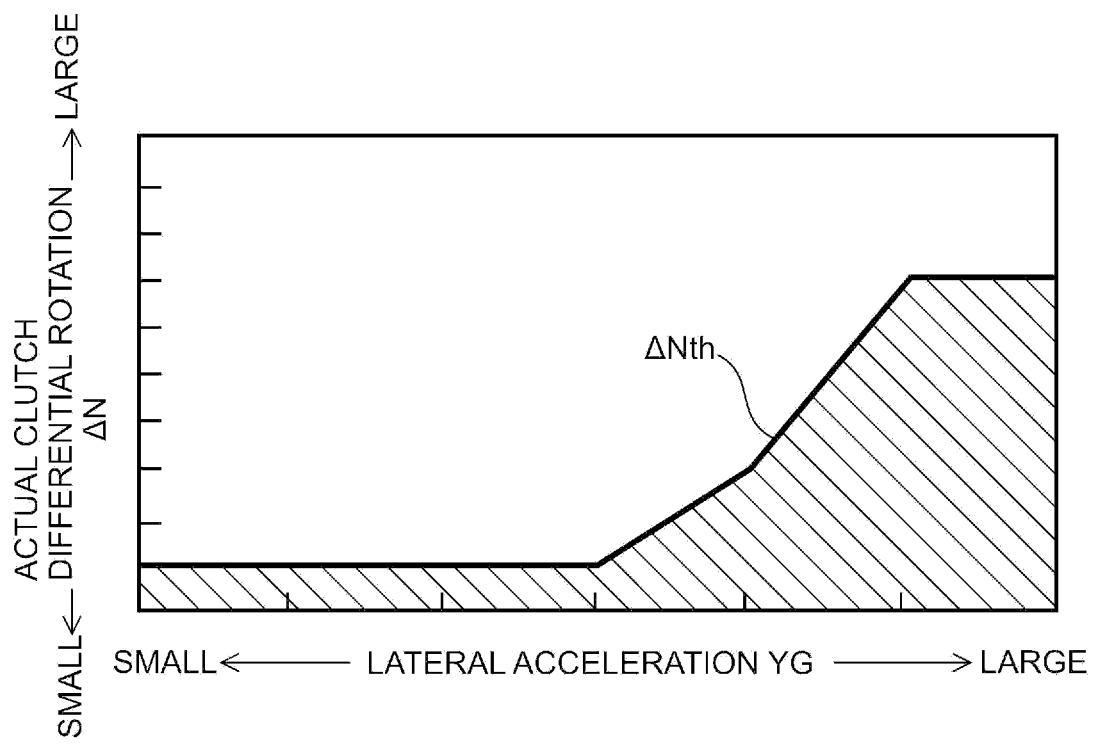
FIG. 5 is a graph showing a threshold for execution and non-execution of an LSD control.

FIG. 5 is a graph showing a threshold for execution and non-execution of the LSD control. In the graph of this figure, the vertical axis indicates the actual clutch differential rotation ΔN, the horizontal axis indicates the lateral acceleration YG of the vehicle, the thick line indicates the threshold ΔNth of the LSD control, and the oblique line indicates the area where no LSD control is performed. The threshold ΔNth is set depending on a magnitude of the lateral acceleration YG of the vehicle 1. In other words, on one hand, the threshold ΔNth is set at a low constant value in the area where the lateral acceleration YG is small. In the area where the lateral acceleration YG is large, on the other hand, the threshold ΔNthe is set at a higher value as the lateral acceleration YG becomes larger.

Back to FIG. 3 again, when the vehicle 1 starts running on a hill slope or when the vehicle 1 is running at an extremely low speed with the front wheel being idling, the stand-by control unit 523 engages (namely, locks) the clutch 10 beforehand with a predetermined torque, and outputs a predetermined torque necessary for starting or running of the vehicle 1 (namely, stand-by torque TR2) as a command torque TRCMD. Also, when the vehicle 1 is running at a relatively low speed with the front wheels being idling, the stand-by control unit 523 outputs a predetermined torque (stand-by torque TR2) as a command torque TRCMD. It should be noted that the stand-by torque TR2 is set at a different value depending on the steering angle δ when the vehicle 1 is running at a low speed with the front wheels idling.

FIG. 6 is a time chart showing an example of each temporal changes in elapsed time t of the main control parameters at the time of turning running of the vehicle 1. It should be noted that no LSD control shall be performed. The vertical axes indicate respectively from the top in order: an accelerator pedal opening AP and a steering angle δ (FIG. 6A); a vehicle speed V (FIG. 6B); a normative yaw rate and an actual yaw rate (FIG. 6C); a yaw rate deviation ΔY (FIG. 6D); and a command torque TRCMD, a rear wheel basic distribution torque TR and a limit torque value TRLIM (FIG. 6E). In addition, all the horizontal axes indicate a common time base.

Figure 6A:
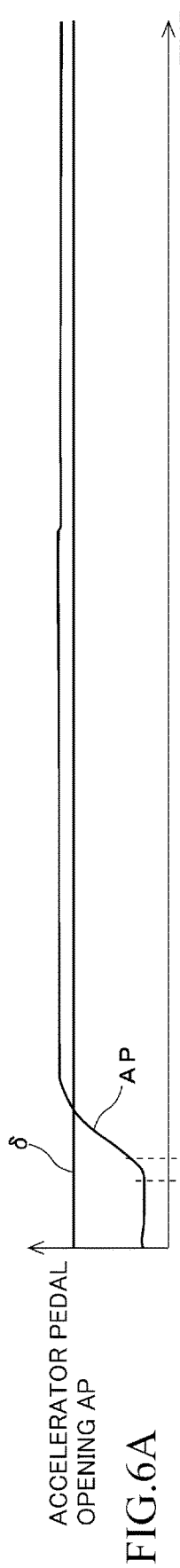
FIGS. 6A to 6E are time charts showing examples of each temporal change of main control parameters at the time of turning running of a vehicle.
Figure 6B:
Figure 6C:
Figure 6D:
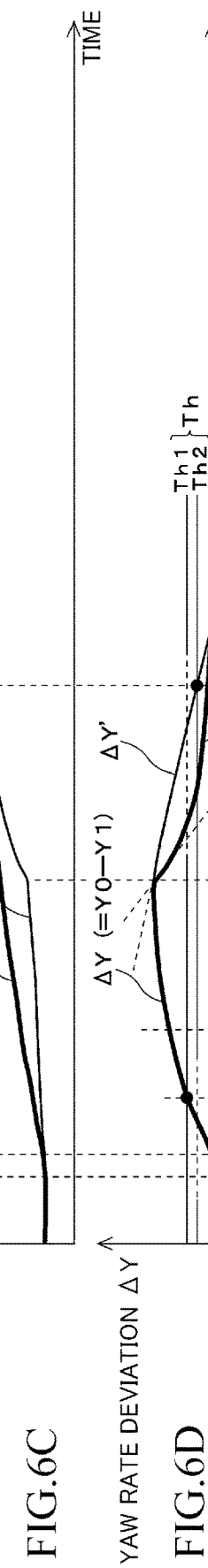
Figure 6E:
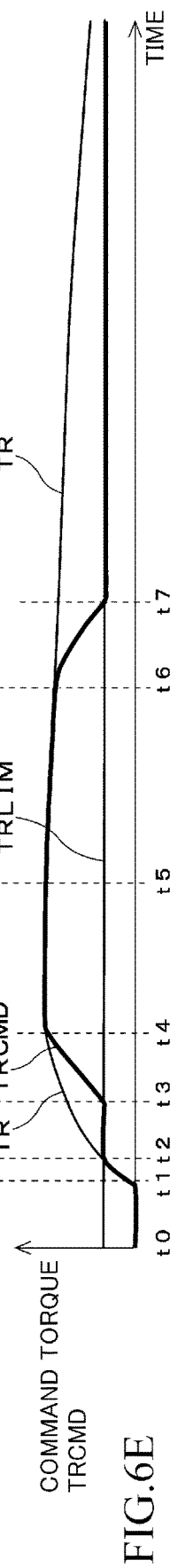

As shown in FIG. 6E, the command torque TRCMD is zero from time t0 to time t1. Thus, a whole drive torque from the engine 3 is distributed to the front wheels (main driving wheels) W1, W2. And as shown in FIG. 6A, the accelerator pedal opening AP and the steering angle δ are approximately constant. Further, as shown in FIG. 6B, the vehicle speed V is constant. As shown in FIG. 6D, the yaw rate deviation ΔY that is a difference between the normative yaw rate Y0 and the actual yaw rate Y1 is zero (namely, in the neutral steer state). It means that the vehicle 1 is turning stably (in the neutral steer state) at a constant speed in the two-wheel drive state.

As shown in FIG. 6A, the accelerator pedal opening AP begins increasing at time t1. As a result, the vehicle speed V begins increasing as shown in 6B. In addition, as shown in FIG. 6E, the command torque TRCMD begins increasing from zero. Therefore, the drive torque from the engine 3 begins to be distributed to the rear wheels (auxiliary driving wheel) W3, W4, and thus the vehicle 1 shifts from the two-wheel-drive state to the four-wheel-drive state.

As shown in FIG. 6D, the yaw rate deviation ΔY is approximately zero from time t1 to time t2. The vehicles 1 is turning accelerating stably (in the neutral steer state) in the four-wheel-drive state.

As shown in FIG. 6E, at time t2, while the command torque TRCMD almost exceeds the limit torque value TRLIM, the command torque TRCMD is limited to the limit value TRLIM as the yaw rate deviation ΔY is smaller than or equivalent to the first threshold Th1.

As shown in FIG. 6E, from time t2 to time t3 the command torque TRCMD becomes equal to the limit torque value TRLIM. As a result, as shown in FIG. 6C, the actual yaw rate Y1 becomes smaller than or equivalent to the normative yaw rate Y0. As a result, as shown in FIG. 6D, the yaw rate deviation ΔY increases. The vehicle 1 is turning accelerating unstably (namely, in the under steer state) in the four-wheel-drive state.

As shown in FIG. 6D, at time t3, the yaw rate deviation ΔY exceeds the first threshold Th1. As a result, as shown in FIG. 6E, the torque limit by the limit torque value TRLIM for the command torque TRCMD (hereinafter referred to as "torque limit for the command torque TRCMD") is released. As a result, the command torque TRCMD begins shifting to the rear wheel basic distribution torque TR.

As shown in FIG. 6E, from time t3 to time t4, the command torque TRCMD increases. In addition, as shown in FIG. 6C, the actual yaw rate Y1 is still lower than the normative yaw rate Y0. As a result, the yaw rate deviation ΔY still increases as shown in FIG. 6D. The vehicle 1 is still turning accelerating unstably (namely, in the under steer state) in the four-wheel-drive state.

As shown in FIG. 6E, at time t4, the command torque TRCMD becomes equal to the rear wheel basic distribution torque TR.

As shown in FIG. 6C, at time t5, the actual yaw rate Y1 begins converging to the normative yaw rate Y0. As a result, as shown in FIG. 6D, the yaw rate deviation Δ begins decreasing (namely, lowering).

And from time t5 onward, the 4WD/ECU 50 calculates a corrected yaw rate deviation (ΔY'), which is a more moderate change in the yaw rate (ΔY) corrected from an actual change. And, the threshold Th (second threshold Th2) is applied to the corrected yaw rate deviation ΔY'. This can lengthen time required to judge that the yaw rate deviation ΔY falls again below the threshold Th after exceeding the threshold Th, and thus can secure time enough to judge that the turning state of the vehicle has shifted from an unstable state to a stable state. Therefore, after having become able to well judge that the turning state of the vehicle has become stable, the command torque TRCMD can be again limited to the limit torque value TRLIM.

Moreover, in FIG. 6, the first threshold Th1 that is a threshold Th when the yaw rate deviation ΔY increases is set different from the second threshold Th2 that is a threshold Th when the yaw rate deviation ΔY decreases. Furthermore, the first threshold Th1 is set to a value larger than the second threshold Th2 (Th1>Th2). Accordingly, the yaw rate deviation steps over the thresholds (namely, the first threshold and the second threshold) repeatedly in a short time, which can prevent a hunting phenomenon that is a frequent repetition of the limit of the command torque by the limit value and the release thereof.

As shown in FIG. 6D, at time t6, the corrected yaw rate deviation ΔY' falls below the threshold Th (second threshold Th2). As a result, as shown in FIG. 6E, the command torque TR is limited to the limit value TRLIM. The command torque TRCMD shifts to the limit torque value TRLIM.

As shown in FIG. 6C, from time t6 to time t7, the actual yaw rate Y1 is almost equal to the normative yaw rate Y0. As a result, as shown in FIG. 6D, the yaw rate deviation ΔY is almost equal to zero. Therefore, the vehicle 1 is turning accelerating stably (in the neutral steer state) in the four-wheel-drive state.

At time t7, the command torque TRCMD equals the limit torque value TRLIM. After time t7 onward, while a user is keeping the steering angle δ and the accelerator pedal opening AP constant, the vehicles 1 is turning accelerating stably (in the neutral steer state) in the four-wheel-drive state.

Figure 7:
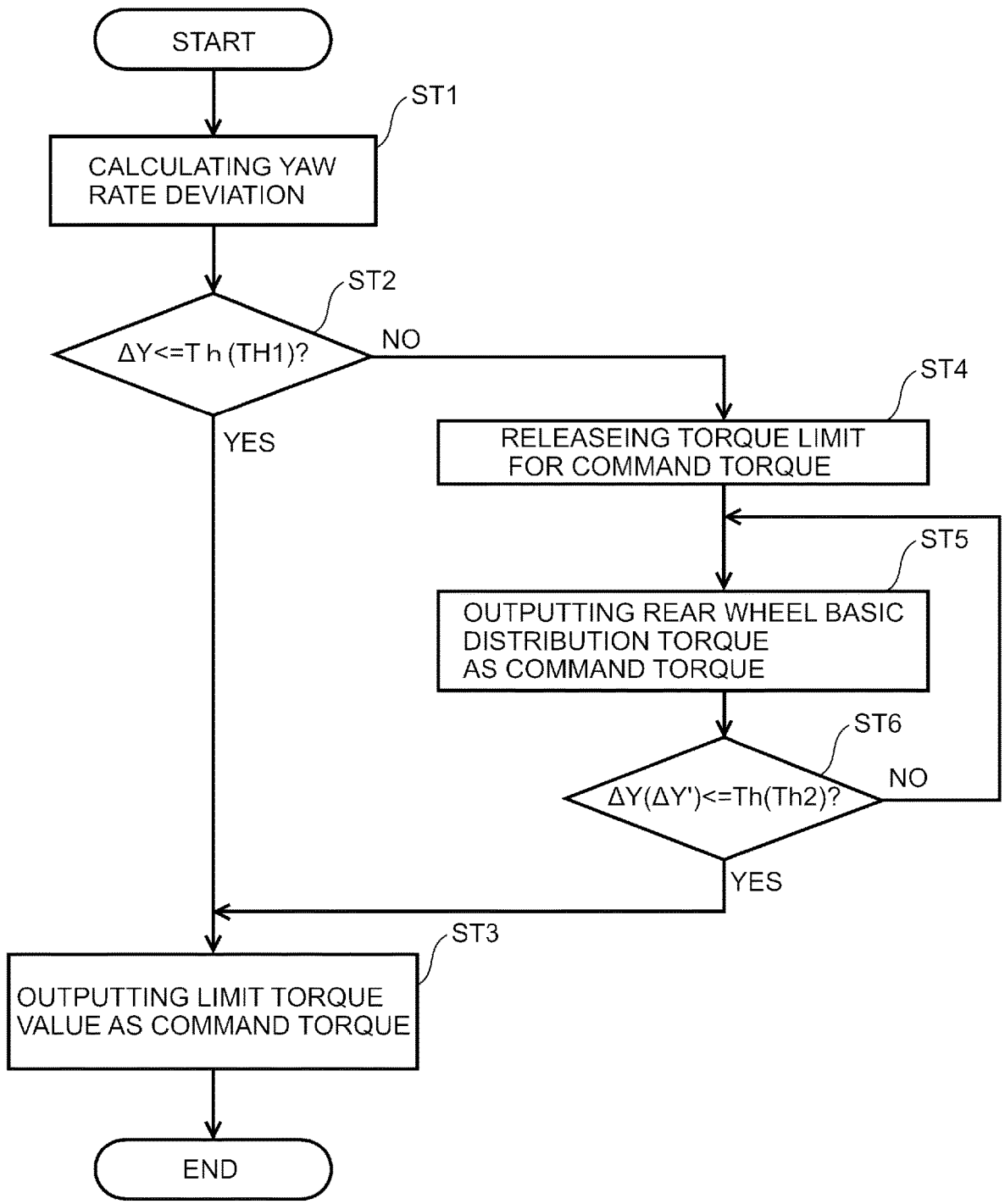
FIG. 7 is a flow chart showing a torque suppression control using a yaw rate deviation at the time of turning running of a vehicle shown in FIG. 6.

FIG. 7 is a flow chart illustrating the torque suppression control by the yaw rate deviation ΔY when the vehicle 1 is turning running as shown in FIG. 6. In step ST1, the yaw rate deviation ΔY is calculated. The yaw rate deviation ΔY is calculated in the yaw rate deviation calculation section 521C on the basis of the normative yaw rate Y0, which is the target value of the yaw rate of the vehicle 1 calculated in the normative yaw rate calculation section 521B based on the vehicle speed V and the steering angle δ of the vehicle 1 and the actual yaw rate Y1 of the vehicle 1 detected by the yaw rate sensor S6.

In step ST2, it is judged whether the yaw rate deviation ΔY is smaller than or equivalent to the threshold Th (first threshold Th1). If the yaw rate deviation ΔY is smaller than or equivalent to the first threshold Th1 (YES), next in step ST3, the limit torque value TRLIM is output as the command torque TRCMD. This corresponds to the temporal change in the command torque TRCMD from time t1 to time t3 and after time t6 onward in FIG. 6E.

On the other hand, if the yaw rate deviation ΔY exceeds the first threshold Th1 (NO) in step ST2, then the torque limit for the command torque TRCMD is released next in step ST4. Thus, the command torque TRCMD shifts from the limit torque value TRLIM to the rear wheel basic distribution torque TR. This corresponds to the temporal change in the command torque TRCMD from time t3 to t4 in FIG. 6E.

Next in step ST5, the rear wheel basic distribution torque TR is output as the command torque TRCMD. This corresponds to the temporal change in the command torque TRCMD from time t4 to time t5 in FIG. 6E.

Next in step ST6, it is judged whether the yaw rate deviation ΔY (corrected yaw rate deviation ΔY') is smaller than or equivalent to the threshold Th (second threshold Th2). If the corrected yaw rate deviation ΔY' is smaller than or equivalent to the second threshold Th2 (YES), then back to step ST3, the limit torque value TRLIM is output as the command torque TRCMD. On the other hand, if the corrected yaw rate deviation ΔY' exceeds the second threshold Th2 (NO), then back to step ST5, the rear wheel basic distribution torque TR is output as the command torque TR. This corresponds to the temporal changes respectively in the yaw rate deviation ΔY and command torque TRCMD from time t5 to time t7.

As described above, according to the control device for the torque distributor of the present embodiment, when the yaw rate deviation ΔY exceeds the first threshold Th1 in the state in which the command torque TRCMD is limited by the limit torque value TRLIM, the control device judges that the vehicle is turning running in an unstable state, greatly deviating from the normative yaw rate Y0, thereby releasing the torque limit for the command torque TRCMD by the limit torque value TRLIM. Accordingly, even in the state in which the command torque TRCMD is limited by the limit torque value TRLIM in consideration of reduction of noises and vibrations, an appropriate torque needed for the stable turning running of the vehicle 1 can be distributed to the rear wheels W3, W4 when the vehicle 1 turns running unstably.

Thus, the turning performance and running performance of the vehicle 1 can be secured on a low friction road surface such as on snow. This can achieve both the reduction of vibrations and noises and the securing of the driving performance of the vehicle by enabling transmission of the necessary torque to the rear wheels W3, W4 using the clutch 10 under a road surface condition that the driving performance of the vehicle is required, while achieving reduction of noises and vibrations due to the torque transmitted to the rear wheels W3, W4 by the clutch 10.

Moreover, the correction of the decreasing yaw rate deviation ΔY to the corrected yaw rate deviation ΔY' that is the more moderate change corrected from the actual change enables lengthening of the time required for the yaw rate deviation ΔY to fall below the second threshold Th2 after exceeding the first threshold Th1. This can secure judgment time enough to judge that the turning state of the vehicle has shifted from an unstable state to a stable state. Therefore, after having become able to well judge that the turning state of the vehicle 1 has shifted from the unstable state to the stable state, the command torque TRCMD can be again limited to the limit torque value TRLIM.

Furthermore, as there are two thresholds, namely the first threshold Th1 and the second threshold Th2, the yaw rate deviation ΔY steps over the thresholds (first threshold Th1 and second threshold Th2) repeatedly in a short time, which can prevent a hunting phenomenon that is a frequent repetition of the limit by the limit torque value TRLIM of the command torque TRCMD and the release thereof.

Second Embodiment

Next, a second embodiment of the invention will be described. In the description of the second embodiment and the corresponding drawings, component parts that are identical or equivalent to those in the first embodiment are denoted by the same symbols, and a detailed description of those parts is omitted. Any features other than those described as below are the same as in the first embodiment.

Figure 8:
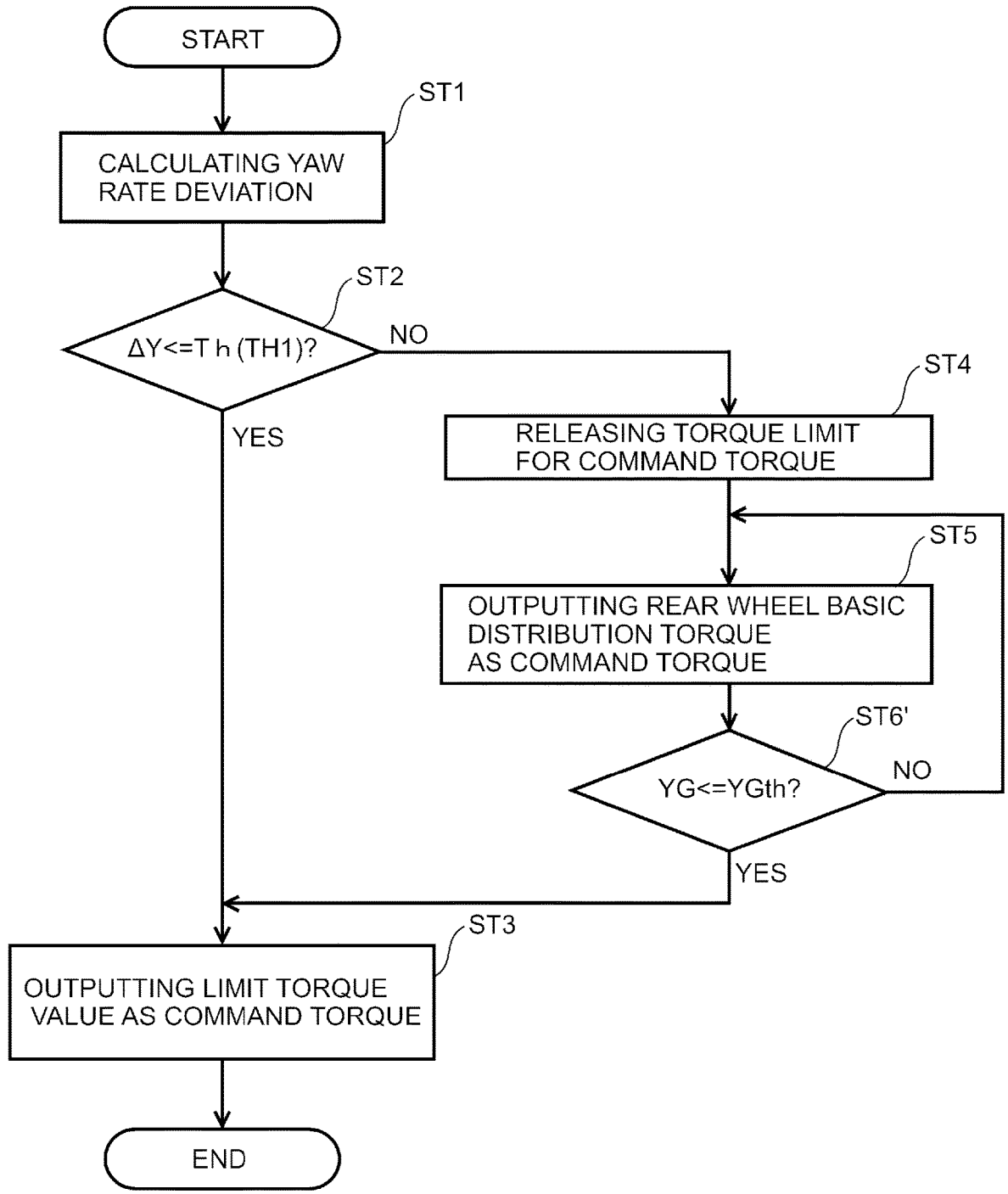
FIG. 8 is a flow chart showing another example of a torque suppression control using a yaw rate deviation at the time of turning running of a vehicle.

FIG. 8 is a flow chart showing another example of the torque suppression control using the yaw rate deviation at the time of turning running of the vehicle. The flow shown in the figure is the same as the flow shown in FIG. 7 of the first embodiment, except for step ST6.

In the flow shown in FIG. 7 of the first embodiment, when the yaw rate deviation ΔY becomes smaller than or equivalent to the threshold Th (second threshold Th2) after exceeding the threshold Th (first threshold Th1), the command torque TRCMD is judged to be limited by the limit torque value TRLIM again (step ST6). In this embodiment, on the other hand, when the lateral acceleration YG of the vehicle 1 becomes smaller than or equivalent to the threshold YGth after the yaw rate deviation ΔY exceeds the threshold Th (first threshold Th1), the command torque TRCMD is judged to be limited by the limit torque value TRLIM again (step ST6'). In other words, it is judged when the vehicle 1 has shifted from the turning running state to the straight running state.

Namely, in step ST6', the lateral acceleration YG of the vehicle 1 is measured from the lateral acceleration sensor S7. Then, if the measured lateral acceleration YG is smaller than or equivalent to the threshold YGth, the vehicle 1 is judged to be running straight stably. In that case, the command torque TRCMD is limited by the limit torque value TRLIM so as to output the limit torque value TRLIM as the command torque TRCMD.

In this manner, when the lateral acceleration YG of the vehicle becomes smaller than or equivalent to the threshold YGth, the vehicle can be judged to have shifted to the straight running state through the turning state. In that case, noises and vibrations due to the torque transmitted to the rear wheels W3, W4 by the clutch 10 can be suppressed by again limiting the command torque TRCMD.

While embodiments of the present invention have been described above, the present invention is not limited to the above-mentioned embodiments, but various modifications are possible within the scope of the technical idea as defined in the claims, the specification, and the drawings.

The invention claimed is:

1. A control device for a torque distributor, the control device comprising:
   a torque transmission path transmitting a torque of power from a power source to first driving wheels and second driving wheels;
   the torque distributor disposed between the power source and the second driving wheels in the torque transmission path; and
   a control means acquiring a demand value of a torque distributed to the second driving wheels using the torque distributor so as to output a command torque that is a command value of the torque corresponding to the demand value of the torque,
   wherein the control device comprises a yaw rate detection section detecting an actual yaw rate of the vehicle,
   wherein the control means has a normative yaw rate calculation section calculating a normative yaw rate that is a target value of a yaw rate of the vehicle and a yaw rate deviation calculation section calculating a yaw rate deviation that is a difference between the normative yaw rate and the actual yaw rate, and
   wherein when the command torque exceeds a predetermined limit value, the control device performs control to limit the command torque to the limit value, and when the yaw rate deviation calculated in the yaw rate deviation calculation section exceeds a predetermined threshold while performing the control to limit the command torque to the limit value, the control device releases the limit of the command torque by the limit value.

2. A control device for a torque distributor according to claim 1, wherein the control means again limits the command torque by the limit value when the yaw rate deviation becomes smaller than or equivalent to the predetermined threshold after exceeding the predetermined threshold.

3. A control device for a torque distributor according to claim 2, wherein when the yaw rate deviation decreases, the control means calculates a corrected yaw rate deviation that is a more moderate change in the yaw rate corrected from an actual change and applies the threshold to the corrected yaw rate deviation.

4. A control device for a torque distributor according to claim 3,
   wherein the threshold consists of a first threshold when the yaw rate deviation increases and a second threshold when the yaw rate deviation decreases, and
   wherein the first threshold is set higher than the second threshold.

5. A control device for a torque distributor according to claim 2,
   wherein the threshold consists of a first threshold when the yaw rate deviation increases and a second threshold when the yaw rate deviation decreases, and wherein the first threshold is set higher than the second threshold.

6. A control device for a torque distributor according to claim 1, the control device comprising a lateral acceleration detection section detecting a lateral acceleration of the vehicle,
   wherein the control means again limits the command torque by the limit value when after the yaw rate deviation exceeds the predetermined threshold, the lateral acceleration detected by the lateral acceleration detection section becomes smaller than or equivalent to a predetermined value.

7. A control device for a torque distributor according to claim 6,
   wherein the threshold consists of a first threshold when the yaw rate deviation increases and a second threshold when the yaw rate deviation decreases, and
   wherein the first threshold is set higher than the second threshold.

8. A control device for a torque distributor according to claim 1, wherein when the yaw rate deviation decreases, the control means calculates a corrected yaw rate deviation that is a more moderate change in the yaw rate corrected from an actual change and applies the threshold to the corrected yaw rate deviation.

9. A control device for a torque distributor according to claim 8,
   wherein the threshold consists of a first threshold when the yaw rate deviation increases and a second threshold when the yaw rate deviation decreases, and
   wherein the first threshold is set higher than the second threshold.

10. A control device for a torque distributor according to claim 1,
    wherein the threshold consists of a first threshold when the yaw rate deviation increases and a second threshold when the yaw rate deviation decreases, and
    wherein the first threshold is set higher than the second threshold.

11. A control device for a torque distributor, the control device comprising:
    a torque transmission path transmitting a torque of power from a power source of a vehicle to first driving wheels and second driving wheels;
    the torque distributor disposed between the power source and the second driving wheels in the torque transmission path; and
    a control means acquiring a demand value of a torque distributed to the second driving wheels using the torque distributor so as to output a command torque that is a command value of a torque corresponding to the demand value of the torque,
    wherein the control device comprises a yaw rate detection section detecting an actual yaw rate of the vehicle,
    wherein the control means has a normative yaw rate calculation section calculating a normative yaw rate that is a target value of a yaw rate of the vehicle and a yaw rate deviation calculation section calculating a yaw rate deviation that is a difference between the normative yaw rate and the actual yaw rate, and
    wherein when the yaw rate deviation is smaller than or equivalent to a predetermined threshold, the control means limits a value of the command torque to a predetermined limit value.

12. A control device for a torque distributor according to claim 11,
    wherein the threshold consists of a first threshold when the yaw rate deviation increases and a second threshold when the yaw rate deviation decreases, and
    wherein the first threshold is set higher than the second threshold.

* * * * *